United States Patent [19]

Kawasaki et al.

[11] Patent Number: 4,767,153
[45] Date of Patent: Aug. 30, 1988

[54] SAFETY STRUCTURE OF VEHICLE BODY ADJACENT INSTRUMENT PANEL

[75] Inventors: Tomoaki Kawasaki, Hatano; Yoshinori Akiyama, Tokyo, both of Japan

[73] Assignee: Nissan Motor Co., Ltd., Japan

[21] Appl. No.: 1,455

[22] Filed: Jan. 8, 1987

[30] Foreign Application Priority Data

Jan. 9, 1986 [JP] Japan .................. 61-1444[U]

[51] Int. Cl.⁴ .................................... B62D 25/08
[52] U.S. Cl. ........................... 296/194; 296/188; 296/70; 180/90; 280/752
[58] Field of Search .............. 296/194, 192, 188, 70, 296/72; 280/752; 180/90

[56] References Cited

U.S. PATENT DOCUMENTS

| 4,400,011 | 8/1983 | Matsuno | 180/90 |
| 4,421,343 | 12/1983 | Yashitsugu | 180/90 |
| 4,432,565 | 2/1984 | Suzuki | 180/90 |
| 4,560,186 | 12/1985 | Onitsuka | 280/752 |

FOREIGN PATENT DOCUMENTS 58-32023 3/1983 Japan .

Primary Examiner—Robert R. Song
Attorney, Agent, or Firm—Leydig, Voit & Mayer

[57] ABSTRACT

A safety structure of a vehicle body adjacent an instrument panel is provided with a stopper spanning between an instrument stay and a front door hinge pillar so as to cooperate with the instrument stay to prevent rearward movements of a heater unit, fan unit and cooling unit of an air conditioner upon a head-on collision or the like.

8 Claims, 3 Drawing Sheets

SAFETY STRUCTURE OF VEHICLE BODY ADJACENT INSTRUMENT PANEL

BACKGROUND OF THE INVENTION

1. Field of the Invention

The present invention relates in general to vehicle body constructions and more particularly to a safety structure of a vehicle body adjacent an instrument panel.

2. Description of the Prior Art

An example of a structure of a vehicle body adjacent an instrument panel is disclosed in the Japanese Provisional Utility Model Publication No. 58-32023 and also shown in FIG. 3.

Referring to FIG. 3, an instrument stay 10 is T-shaped in structure and consists of a horizontal rigid member 12 disposed adjacently rearwards of an air box 14 and secured to same, and a pair of depending rigid members 16 depending from the intermediate portion of the horizontal member 12 to be connected to a vehicle body floor tunnel portion 18. A vehicle equipment such as an air conditioner 20 is located between the instrument stay 10 and a dash lower panel 22 to be attached to the air box 14 and the dash lower panel 22. The air conditioner 20 includes a heater unit 24 just in front of the depending part of the instrument stay 10, a fan unit 26 in the vicinity of a front door hinge pillar 28 on the side of a front passenger seat 32 and a cooling unit 30 intermediate between the fan unit 26 and the heater unit 24 and in front of the front passenger seat 32. An instrument pad 33 is secured to the instrument stay 10, air box 14, etc. by means of brackets and screws.

The foregoing structure is disadvantageous from the safety point of view since upon a head-on collision or the like the constituent units of the air conditioner 20 except for the unit just in front of the depending part of the instrument stay 10, i.e., the fan unit 26 and the cooling unit 30 are pushed out from their correct places to move toward the front passenger seat 32.

SUMMARY OF THE INVENTION

In accordance with the present invention, there is provided a novel and improved safety structure of a vehicle body adjacent an instrument panel. The safety structure is provided with a stopper extending between an instrument stay and one lateral end of a vehicle body to prevent rearward movement of a vehicle equipment.

The provision of the above stopper is quite effective for overcoming the above noted disadvantage of the prior art structure.

It is accordingly an object of the present invention to provide a novel and improved safety structure of a vehicle body adjacent an instrument panel which can prevent an occupant of a front passenger seat of a vehicle from being injured by a vehicle equipment such as an air conditioner upon a head-on collision or the like.

It is a further object of the present invention to provide a novel and improved safety structure of the above described character which is practically quite useful though so simple in structure.

DESCRIPTION OF THE PREFERRED EMBODIMENT

Figure 1:
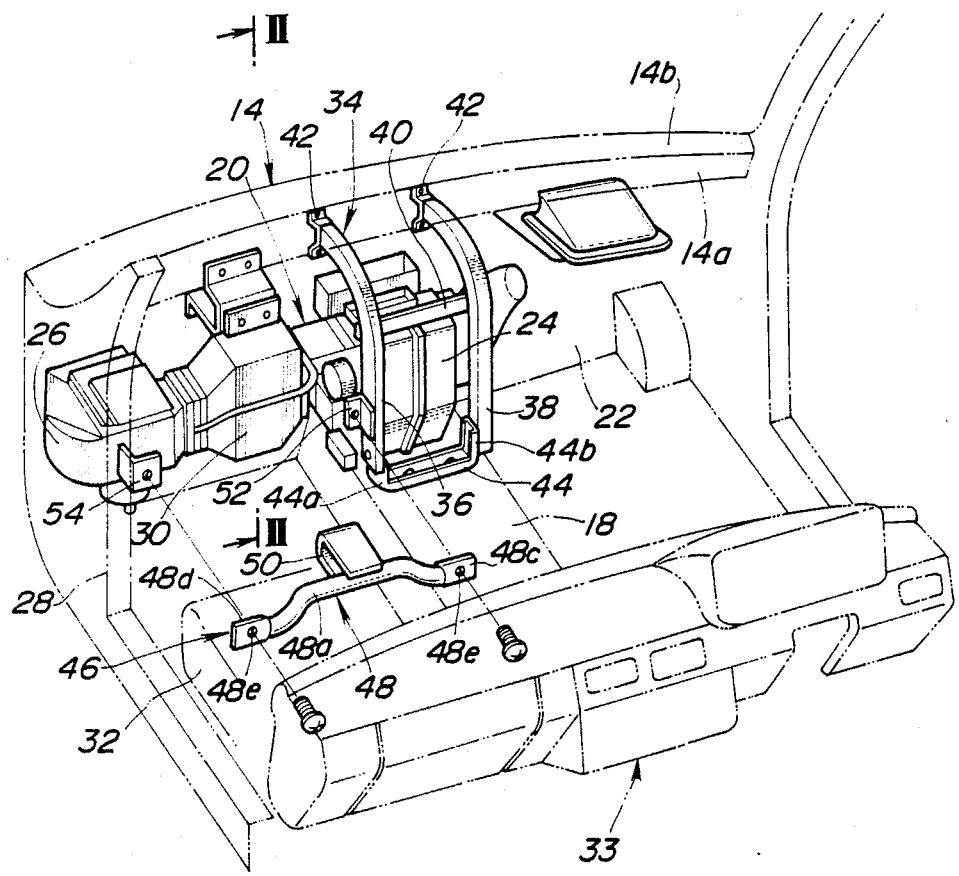
FIG. 1 is a perspective, partly exploded, view of a safety structure of a vehicle body adjacent an instrument panel according to an embodiment of the present invention.
Figure 2:
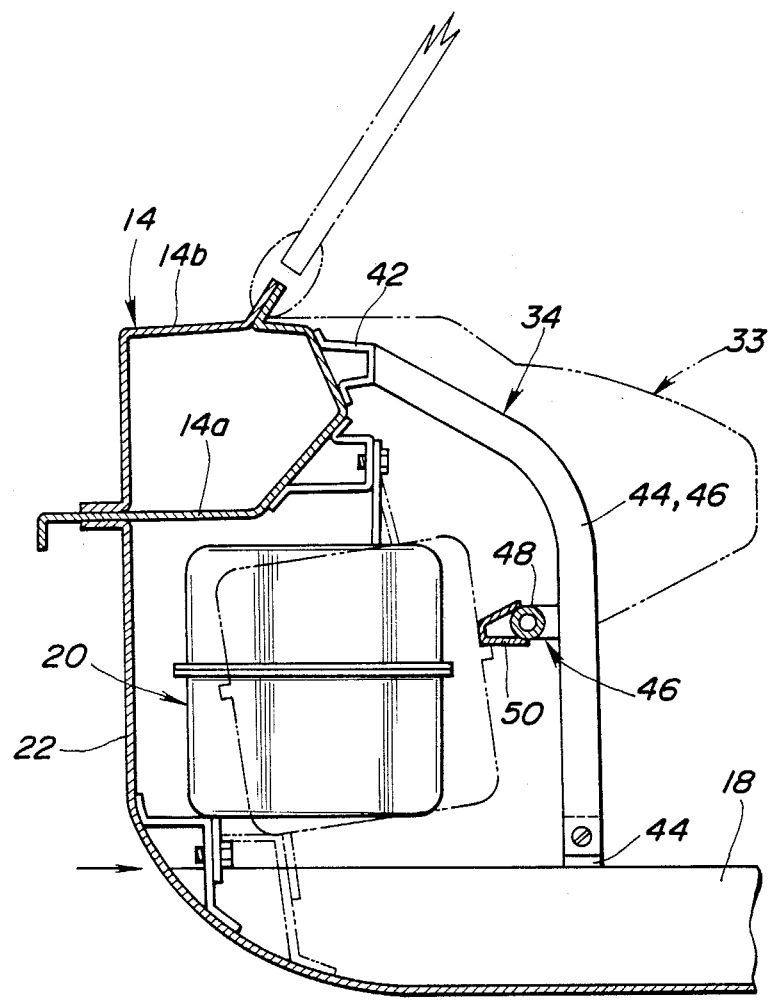
FIG. 2 is a sectional view taken along the line II—II of FIG. 1.
Figure 3:
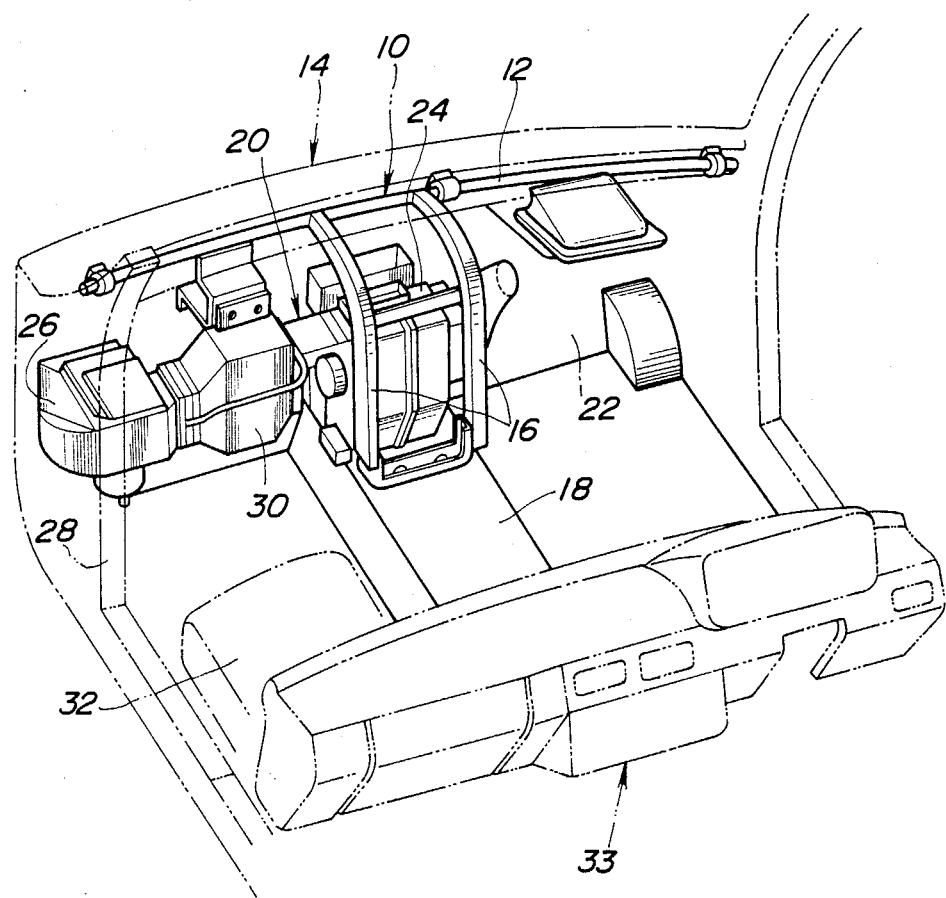
FIG. 3 is a perspective, partly exploded, view of a prior art structure of a vehicle body adjacent an instrument panel.

Referring to FIGS. 1 and 2, in which like or corresponding parts to those of the prior art structure of FIG. 3 are designated by the like reference characters, a safety structure of this invention includes an instrument stay 34 disposed between the air box 14 and the vehicle body floor tunnel portion 18. The air box 14 is formed from a dash upper panel 14a and a cowl top panel 14b to constitute a rigid vehicle body frame extending laterally of the vehicle body and has a box-like cross section as seen from FIG. 2. The instrument stay 34 consists of a pair of depending rigid members 36, 38 which are spaced from each other in a vehicle width direction or in the lateral direction of the vehicle body while spanning between the longitudinally intermediate portion of the air box 14 and the floor tunnel portion 18, and a horizontal or transveral rigid member 40 interconnecting the depending rigid members 36, 38 so as to form together therewith an H-shaped structure. The pair of depending rigid members 36, 38 are bolted at their upper ends to the air box 14 by way of brackets 42 and at their lower ends to the floor tunnel portion 18 by way of a bracket 44. The bracket 44 has a U-like shape and includes a pair of upstanding end portions 44a, 44b bolted to the lower ends of the depending rigid members 36, 38.

The safety structure further includes a detachable stopper 46 for preventing the vehicle equipment as the air conditioner 20 from being pushed out from its correct place to move toward the front passenger seat 32. The stopper 46 consists of a horizontal rigid stopper member 48 made of a rigid pipe material and spanning between the front door hinge pillar 28 and the instrument stay 34 and an abutment member 50 secured to the horizontal stopper member 48 to project forwardly therefrom. More specifically, the horizontal stopper member 48 has a longitudinally central portion 48a projecting forwardly from the remaining end portions thereof so as to have a bow-like shape and also has at the opposite ends thereof connecting portions 48c, 48d which are in the form of a planar plate and respectively formed with bolt accommodation holes 48e. The stopper 46 is fixed in place by bolting one of the connecting portions 48c to a bracket 52 provided to one of the depending rigid members 36 of the instrument stay 34 while bolting the other connecting portion 48d to a bracket 54 provided to the front door hinge pillar 28. The abutment member 50 is so shaped as to have a V-like cross section and is secured, at their rearward ends which are arranged to oppose vertically, to the upper and lower faces of the horizontal rigid member 48 so as to be joined integrally therewith.

With the foregoing structure, upon a head-on collision or the like, the dash lower panel 22 may be deformed so as to push the fan unit 26, cooling unit 30 and the heater unit 30 out of their correct places and allow them to move toward the front passenger seat 32 as indicated by the two-dot chain lines in FIG. 2. When this is the case, further rearward movement of the heater unit 24 is prevented by the instrument stay 34 and at the same time further rearward movements of the fan unit 24 and the cooling unit 30 are prevented by the stopper 46. Accordingly, units of the air conditioner 20 are prevented from being pushed out of their correct places to injure an occupant of the front passenger seat.

In the foregoing, it is to be understood that the stopper 46 does not cause any harm to the maintenance of the air conditioner 20 since it is detachably installed.

What is claimed is:

1. A safety structure of a vehicle body adjacent an instrument panel, comprising:
   an air box extending laterally of the vehicle body and having a longitudinally intermediate portion;
   a vehicle floor;
   an instrument stay spanning between said intermediate portion of said air box and said vehicle floor;
   vehicle equipment disposed forwardly of said instrument stay;
   a front door hinge pillar located nearer to a front passenger seat; and
   a detachable, elongated rigid stopper member spanning between said instrument stay and said front door hinge pillar to prevent rearward movement of said vehicle equipment toward an occupant of the front passenger seat.

2. A safety structure as set forth in claim 1 wherein said instrument stay comprises a pair of depending rigid members which are spaced from each other in the lateral direction of the vehicle body and a transversal rigid member interconnecting said depending members.

3. A safety structure as set forth in claim 2 wherein said vehicle floor comprises a tunnel portion, said depending members being secured at the lower ends thereof to said tunnel portion and at the upper ends thereof to said air box.

4. A safety structure as set forth in claim 3 wherein said stopper member is bolted at the opposite ends thereof to said front door hinge pillar and one of said depending members located nearer to the front passenger seat, and an abutment member secured to said stopper member to project forwardly therefrom.

5. A safety structure as set forth in claim 4 wherein said stopper member has a central portion projecting forwardly from the remaining end portions to have a bow-like shape.

6. A safety structure as set forth in claim 5 wherein said stopper member is made of a pipe material, and said stopper member has a V-like shape and is secured, at their rearward ends which are arranged to oppose vertically, to the upper and lower sides of said stopper member.

7. A safety structure as set forth in claim 6 wherein said vehicle equipment comprises an air conditioner disposed rearwards of a dash lower panel.

8. A safety structure as set forth in claim 7 wherein said air conditioner includes a plurality of constituent units one of which is disposed in front of said instrument stay and the remaining units are disposed in front of said stopper.

* * * * *